(12) United States Patent
Strom et al.

(10) Patent No.: US 7,644,446 B2
(45) Date of Patent: Jan. 5, 2010

(54) ENCRYPTION AND DATA-PROTECTION FOR CONTENT ON PORTABLE MEDIUM

(75) Inventors: Clifford P. Strom, Sammamish, WA (US); Ian Cameron Mercer, Sammamish, WA (US); James Morris Alkove, Woodinville, WA (US); Jeffrey R. McKune, Sammamish, WA (US); Kevin Leigh LaChapelle, Redmond, WA (US); Michael Jay Parks, Kirkland, WA (US); Shunji Harada, Osaka (JP); Toshihisa Nakano, Neyagawa (JP); Kaoru Murase, Nara (JP)

(73) Assignees: Microsoft Corporation, Redmond, WA (US); Panasonic Corporation, Osaka (JP)

( * ) Notice: Subject to any disclaimer, the term of this patent is extended or adjusted under 35 U.S.C. 154(b) by 830 days.

(21) Appl. No.: 10/945,542

(22) Filed: Sep. 20, 2004

(65) Prior Publication Data

US 2005/0114689 A1 May 26, 2005

Related U.S. Application Data

(60) Provisional application No. 60/513,897, filed on Oct. 23, 2003.

(51) Int. Cl.
G06F 21/00 (2006.01)
G06F 17/30 (2006.01)
H04N 7/16 (2006.01)

(52) U.S. Cl. .................. 726/32; 713/193; 380/277
(58) Field of Classification Search ............. 713/193; 380/277; 726/28–30
See application file for complete search history.

(56) References Cited

U.S. PATENT DOCUMENTS 5,293,310 A * 3/1994 Carroll et al. ................ 705/14
5,661,800 A * 8/1997 Nakashima et al. ........... 726/27

(Continued)

FOREIGN PATENT DOCUMENTS

EP 1288942 A1 3/2003

(Continued)

OTHER PUBLICATIONS

Gregory Kesden, Lecture 33: Content Scrambling System, Dec. 6, 2000.*

(Continued)

*Primary Examiner*—Gilberto Barron, Jr.
*Assistant Examiner*—Cordelia Kane
(74) *Attorney, Agent, or Firm*—Senniger Powers LLP

(57) ABSTRACT

A source generates a medium key (KM) and a media secret table including a plurality of entries, each entry including (KM) encrypted by a public key (PU-PD) of a plurality of devices, obtains the medium ID of a medium therefrom, generates a content key (KD) for a piece of content, encrypts the content with (KD) to result in (KD(content)), encrypts (KD) with (KM) to result in (KM(KD)), generates a package for the content including (KD(content)), (KM(KD)), the medium ID, and a signature based on at least the medium ID and verifiable with (KM), and copies the generated package and the media secret table to the medium. Thus, a device with the medium and a private key (PR-PD) corresponding to an entry of the media secret table can access and render the content.

30 Claims, 6 Drawing Sheets

U.S. PATENT DOCUMENTS

| | | |
|---|---|---|
| 5,892,535 A | 4/1999 | Allen et al. |
| 5,915,018 A | 6/1999 | Aucsmith |
| 6,006,234 A | 12/1999 | Govindarajan et al. |
| 6,199,059 B1 | 3/2001 | Dahan et al. |
| 6,212,524 B1 | 4/2001 | Weissman et al. |
| 6,226,618 B1 | 5/2001 | Downs et al. |
| 6,240,407 B1 | 5/2001 | Chang et al. |
| 6,256,031 B1 | 7/2001 | Meijer et al. |
| 6,263,341 B1 | 7/2001 | Smiley |
| 6,269,394 B1 | 7/2001 | Kenner et al. |
| 6,282,548 B1 | 8/2001 | Burner et al. |
| 6,311,194 B1 | 10/2001 | Sheth et al. |
| 6,343,281 B1 * | 1/2002 | Kato ..................... 705/57 |
| 6,363,377 B1 | 3/2002 | Kravets et al. |
| 6,389,426 B1 | 5/2002 | Turnbull et al. |
| 6,405,215 B1 | 6/2002 | Yaung |
| 6,430,575 B1 | 8/2002 | Dourish et al. |
| 6,438,235 B2 | 8/2002 | Sims, III |
| 6,449,341 B1 | 9/2002 | Adams et al. |
| 6,526,411 B1 | 2/2003 | Ward |
| 6,550,009 B1 | 4/2003 | Uranaka et al. |
| 6,550,011 B1 | 4/2003 | Sims, III |
| 6,557,042 B1 | 4/2003 | He et al. |
| 6,657,117 B2 | 12/2003 | Weare et al. |
| 6,661,437 B1 | 12/2003 | Miller et al. |
| 6,721,489 B1 | 4/2004 | Benyamin et al. |
| 6,728,729 B1 | 4/2004 | Jawa et al. |
| 6,735,628 B2 | 5/2004 | Eyal |
| 6,738,878 B2 | 5/2004 | Ripley et al. |
| 6,760,721 B1 | 7/2004 | Chasen et al. |
| 6,839,059 B1 | 1/2005 | Anderson et al. |
| 6,865,431 B1 | 3/2005 | Hirota et al. |
| 6,993,508 B1 | 1/2006 | Major et al. |
| 2001/0011284 A1 | 8/2001 | Humpleman et al. |
| 2002/0026521 A1 | 2/2002 | Sharfman et al. |
| 2002/0033844 A1 | 3/2002 | Levy et al. |
| 2002/0071553 A1 * | 6/2002 | Shirai et al. ............. 380/42 |
| 2002/0078144 A1 | 6/2002 | Lamkin et al. |
| 2002/0107803 A1 * | 8/2002 | Lisanke et al. ............. 705/51 |
| 2002/0138619 A1 | 9/2002 | Ramaley et al. |
| 2002/0151363 A1 | 10/2002 | Letovsky et al. |
| 2002/0157002 A1 | 10/2002 | Messerges et al. |
| 2002/0172495 A1 | 11/2002 | Han |
| 2002/0180803 A1 | 12/2002 | Kaplan et al. |
| 2003/0016950 A1 | 1/2003 | Ando et al. |
| 2003/0021413 A1 * | 1/2003 | Kiiveri et al. ............ 380/247 |
| 2003/0044020 A1 | 3/2003 | Aboba et al. |
| 2003/0099354 A1 | 5/2003 | Shavit et al. |
| 2003/0108335 A1 | 6/2003 | Nakamura et al. |
| 2003/0146915 A1 | 8/2003 | Brook et al. |
| 2003/0151618 A1 | 8/2003 | Johnson et al. |
| 2004/0001106 A1 | 1/2004 | Deutscher et al. |
| 2004/0003398 A1 | 1/2004 | Donian et al. |
| 2004/0064476 A1 | 4/2004 | Rounds |
| 2004/0167890 A1 | 8/2004 | Eyal |
| 2005/0081159 A1 | 4/2005 | Gupta et al. |

FOREIGN PATENT DOCUMENTS

| | | |
|---|---|---|
| WO | WO 01/28222 A2 | 4/2001 |
| WO | WO 03/023781 A1 | 3/2003 |

OTHER PUBLICATIONS

Bao, Feng, "Multimedia Content Protection by Cryptography and Watermarking in Tamper-Resistant Hardware", Proceedings of the 2000 ACM Workshops on Multimedia, 2000, pp. 139-142, ACM Press, New York, USA.

Wei, Wanli et al, "Data Security Technology in Network Communication", Net Security Technologies and Application, 2002, 8 pages.

* cited by examiner

ENCRYPTION AND DATA-PROTECTION FOR CONTENT ON PORTABLE MEDIUM

CROSS-REFERENCE TO RELATED APPLICATIONS

This application claims the benefit of U.S. Provisional Patent Application Ser. No. 60/513,897 entitled "ENCRYPTION AND DATA-PROTECTION FOR CONTENT ON PORTABLE MEDIUM," filed Oct. 23, 2003, naming Alkove et al. as inventors, the entire disclosure of which is incorporated by reference herein.

TECHNICAL FIELD

The present invention relates to an architecture for enforcing rights in digital content. More specifically, the present invention relates to such an enforcement architecture that allows access to encrypted digital content on a portable medium only in accordance with rules associated with the content. Even more specifically, the present invention relates to such an architecture that ties the content to a uniquely identifiable portable medium such that the content cannot be rendered from any other medium.

BACKGROUND OF THE INVENTION

As is known, and referring now to FIG. 1, a rights management (RM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer, a portable playback device, or other user computing device 14.

Typically, a content owner distributing such digital content 12 wishes to restrict what the user may do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. An RM system 10 allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (e.g., (KD(CONTENT))), as well as other information identifying the content, how to acquire a license for such content, etc.

The trust-based RM system 10 allows an owner of digital content 12 to specify rules to be satisfied before such digital content 12 is allowed to be rendered. Such rules may include those aforementioned and/or others, and may be embodied within a digital license 16 that the user/user's computing device 14 (hereinafter, such terms are interchangeable unless circumstances demand otherwise) obtains from the content owner or an agent thereof, or such rules may already be attached to the content 12. Such license 16 may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner trusts that the user will abide by the rules specified by such content owner in the license 16 or elsewhere. The user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the RM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 specify whether the user has rights to so render based on any of several factors, including who the user is, where the user is located, what type of computing device 14 or other playback device the user is using, what rendering application is calling the RM system 10, the date, the time, etc. In addition, the rules may limit rendering to a pre-determined number of plays, or pre-determined play time, for example.

The rules may be specified according to any appropriate language and syntax. For example, the language may simply specify attributes and values to be satisfied (e.g., a DATE later than X), or may specify the performance of functions according to a specified script (e.g., IF DATE greater than X, THEN DO Y).

Upon the evaluator 20 determining that the user satisfies the rules, the digital content 12 is rendered. In particular, to render the content 12, the decryption key (KD) is obtained from a pre-defined source and is applied to (KD(CONTENT)) from the content package 13 to result in the actual content 12, and the actual content 12 is in fact rendered.

In an RM system 10, content 12 is packaged for use by a user by encrypting such content 12 and associating a set of rules with the content 12, whereby the content 12 is renderable only in accordance with the rules. Because the content 12 is only rendered in accordance with the rules, the content 12 may be freely distributed. Significantly, the content 12, the rules, and an encrypted version of the decryption key (KD) are communicated to the computing device 14 or other playback device. Moreover, in preparing at least the encrypted version of the decryption key (KD), it would be useful to tie the decryption key (KD) to an object in such a manner that the encrypted version of the decryption key may not be accessed to decrypt and render the content 12 except in the presence of such object. Thus, the content 12, the rules, and the encrypted version of the decryption key (KD) may not be redistributed in a manner so that the content 12 may be rendered widely and in contravention to the wishes of the content owner. As may be appreciated, such object to which the encrypted decryption key (KD) is tied to may be a computing device 14 or other playback device or may be a storage medium such as a disk drive, an optical or magnetic storage disk, or the like.

Accordingly, a copy protection system for personal computers, consumer electronic devices, and other computing devices that is secure, simple, lightweight, and affordable is desired to address one or more of these and other disadvantages.

SUMMARY OF THE INVENTION

The aforementioned needs are satisfied at least in part by the present invention in which a source stores a piece of digital content on a storage medium in a manner accessible by any of a plurality of devices having a public-private key pair (PU-PD, PR-PD) and able to receive or have the storage medium. In one embodiment, the invention provides a method and mechanism that allows the RM system 10 to tie the encrypted decryption key (KD) to an object such that the encrypted decryption key (KD) may not be obtained except in the presence of such object. In another embodiment, the object is portable, such as an optical or magnetic storage disk, so that a user transports the object with the encrypted decryption key thereon among multiple computing devices 14 or other playback devices.

A device may be assigned more than one set of public-private key pairs. The source generates a medium key (KM) and obtains a master key list that includes a plurality of entries therein and a version number. Each entry includes a (PU-PD) of one of the plurality of devices. The source generates a media secret table based on (KM) and the master key list, where the media secret table includes a plurality of entries corresponding to at least a sub-set of the plurality of entries of the master key list. Each entry of the media secret table includes (KM) encrypted by the (PU-PD) of the corresponding entry of the table (PU-PD(KM)).

The source obtains the medium identifier (ID) of the medium therefrom, generates a content key (KD) for the piece of content, encrypts the content with (KD) to result in (KD(content)), encrypts (KD) with (KM) to result in (KM(KD)), generates a package for the content including (KD(content)), (KM(KD)), the medium ID, and a signature based on at least the medium ID and verifiable with (KM), and copies the generated package, the master key list, and the media secret table to the medium. Further, usage rules (e.g., a license) associated with the content may also be stored on the medium.

Thus, a device with the medium upon receiving a request to render the content thereon obtains the media secret table from the medium, obtains (PR-PD) thereof, indexes into an entry of the media secret table based on the obtained (PR-PD), obtains (PU-PD(KM)) from the indexed-into entry of the media secret table, applies (PR-PD) to (PU-PD(KM)) to expose (KM), verifies the digital signature of the content package based on (KM), obtains the medium ID from the content package, obtains the medium ID from the medium, verifies that the medium ID from the content package matches the medium ID from the medium, and, if the digital signature verifies and the medium IDs verify, obtains (KM(KD)) from the package, applies (KM) to (KM(KD)) to expose (KD), obtains (KD(content)) from the content package on the storage medium, applies (KD) to (KD(content)) to expose the content, and renders the exposed content in accordance with the usage rules stored on the medium.

In accordance with one aspect of the invention, a method encrypts content with copy protection for storage on a destination computer-readable medium. The method includes generating a medium key to be associated with a destination computer-readable medium and encrypting the generated medium key with one or more public keys. Each of the public keys correspond to an end user device. The method includes encrypting the content with a content key and encrypting the content key with the medium key. The method also includes defining a medium identifier associated with the destination computer-readable medium and associating the defined medium identifier with the encrypted content. The method also includes storing the encrypted content, encrypted content key, encrypted medium keys, and associated medium identifier to the destination computer-readable medium, wherein comparing the defined medium identifier with the medium identifier associated with the encrypted content prior to rendering the content provides copy protection for the content.

In accordance with another aspect of the invention, a method decrypts copy-protected content stored on a computer-readable medium for rendering by an end user device. The computer-readable medium stores a package including encrypted content, an encrypted content key, one or more medium keys each being encrypted by a public key associated with one of a plurality of end user devices, and a medium identifier. The end user device has a private key associated therewith. The method includes calculating a medium key for the end user device from the encrypted medium keys as a function of the private key. The method also includes defining a medium identifier for the computer-readable medium and comparing the defined medium identifier with the medium identifier stored in the package. The method further includes decrypting the encrypted content key with the calculated medium key and decrypting the encrypted content with the decrypted content key if the defined medium identifier corresponds to the medium identifier stored in the package as a function of comparing.

In accordance with still another aspect of the invention, a system records content with copy protection onto a computer-readable medium. The system includes a memory area for storing content, a medium identifier associated with the computer-readable medium, one or more public keys each corresponding to an end user device, and one or more usage rules associated with the stored content. The system also includes a processor configured to execute computer-executable instructions for generating a medium key to be associated with the computer-readable medium, encrypting the generated medium key with each of the public keys stored in the memory area, encrypting the content stored in the memory area with a content key, encrypting the content key with the medium key, and storing the encrypted content, the encrypted content key, the encrypted medium keys, and the associated medium identifier to the computer-readable medium.

In accordance with yet another aspect of the invention, a system renders copy protected content stored on a computer-readable medium by an end user device. The system includes a memory area for storing a medium identifier associated with the computer-readable medium, encrypted content, a medium identifier associated with the encrypted content, an encrypted content key, one or more medium keys each encrypted by a public key associated with one of a plurality of end user devices, and a private key associated with the end user device. The system also includes a processor configured to execute computer-executable instructions for calculating a medium key for the end user device from the encrypted medium keys stored in the memory area as a function of the private key, and comparing the medium identifier associated with the computer-readable medium with the medium identifier associated with the encrypted content. The processor is further configured to execute computer-executable instructions for decrypting the encrypted content key with the calculated medium key and decrypting the encrypted content with the decrypted content key if the medium identifier associated with the computer-readable medium corresponds to the medium identifier associated with the encrypted content as a function of the compared medium identifier.

In accordance with another aspect of the invention, one or more computer-readable media have computer-executable components that provide copy protection for content. The components are executable on an end user device. The components include an encryption component for encrypting the content by generating a medium key to be associated with a computer-readable medium and encrypting the generated medium key with one or more public keys. Each of the public keys corresponds to an end user device. The encryption component creates a media secret table for the content. The media secret table includes the encrypted medium keys. The encryption component further encrypts the content with a content key, encrypts the content key with the medium key, defines a medium identifier associated with the destination computer-readable medium, associates the defined medium identifier with the encrypted content, and stores the encrypted content, encrypted content key, media secret table, and associated medium identifier as a group on the computer-readable medium. The components also include a decryption component for decrypting the content encrypted by the encryption component and enforcing copy protection by calculating the medium key for the end user device from the media secret table as a function of the private key, determining a reference medium identifier for the computer-readable medium, and comparing the determined reference medium identifier with the medium identifier stored in the group. The decryption component further decrypts the encrypted content key with the calculated medium key and decrypts the encrypted content with the decrypted content key if the determined reference medium identifier corresponds to the medium identifier stored in the group as a function of the compared medium identifier.

Alternatively, the invention may comprise various other methods and apparatuses.

Other features will be in part apparent and in part pointed out hereinafter.

BRIEF DESCRIPTION OF THE DRAWINGS

As should be understood, the invention is not limited to the precise arrangements and instrumentalities shown in the following figures.

Corresponding reference characters indicate corresponding parts throughout the drawings.

DETAILED DESCRIPTION OF THE INVENTION

Typically, an RM system 10 such as has been set forth above protects digital content 12 by among other things having a user's computing device 14 authenticate itself as a legitimate RM component and transmitting one or more cryptographic keys for purposes of constructing and receiving an encrypted version of a decryption key (KD) by which the content 12 may be accessed. Such authentication and key transmittal may include, but is not limited to, an interactive process including signed certificates, negotiations, exchanges of asymmetric and symmetric keys, and the like, where the interactive process is accomplished over a network connection or the like between the computing device 14 and a remote entity such as a license server.

However, it is to be appreciated that in doing so the content 12 is in effect tied to the computing device 14 and therefore is not able to be rendered except in the presence of such computing device 14. Especially in the case when a user of the content 12 may wish to transport such content 12 among several computing devices 14 and/or other playback devices, it would be desirable to store the content 12 on a portable medium along with rules for accessing the content 12 and the encrypted version of the decryption key (KD). However, it would also be desirable to prevent such items from being widely redistributed in a manner contrary to the wishes of the content owner. Accordingly, in one embodiment of the present invention, at least the encrypted decryption key (KD) is tied to the portable medium in a manner such that such decryption key (KD) may not be accessed except in the presence of such portable medium.

As may be appreciated, such portable medium may be any portable medium without departing from the spirit and scope of the present invention. For example, such portable medium may be an optical or magnetic disk such as a CD or DVD disk or a floppy disk, or may be a portable smart card, a portable RAM card, a portable media card, a portable hard drive, or the like with digital memory thereon. Significantly, to tie the encrypted version of the decryption key (KD) to the portable medium, such portable medium should include a unique identification or ID that is not easily alterable or copied and that is machine-readable. Such ID may for example be the unique bar code ID on every DVD disc that is located near the hub thereof, or the like.

Figure 1:
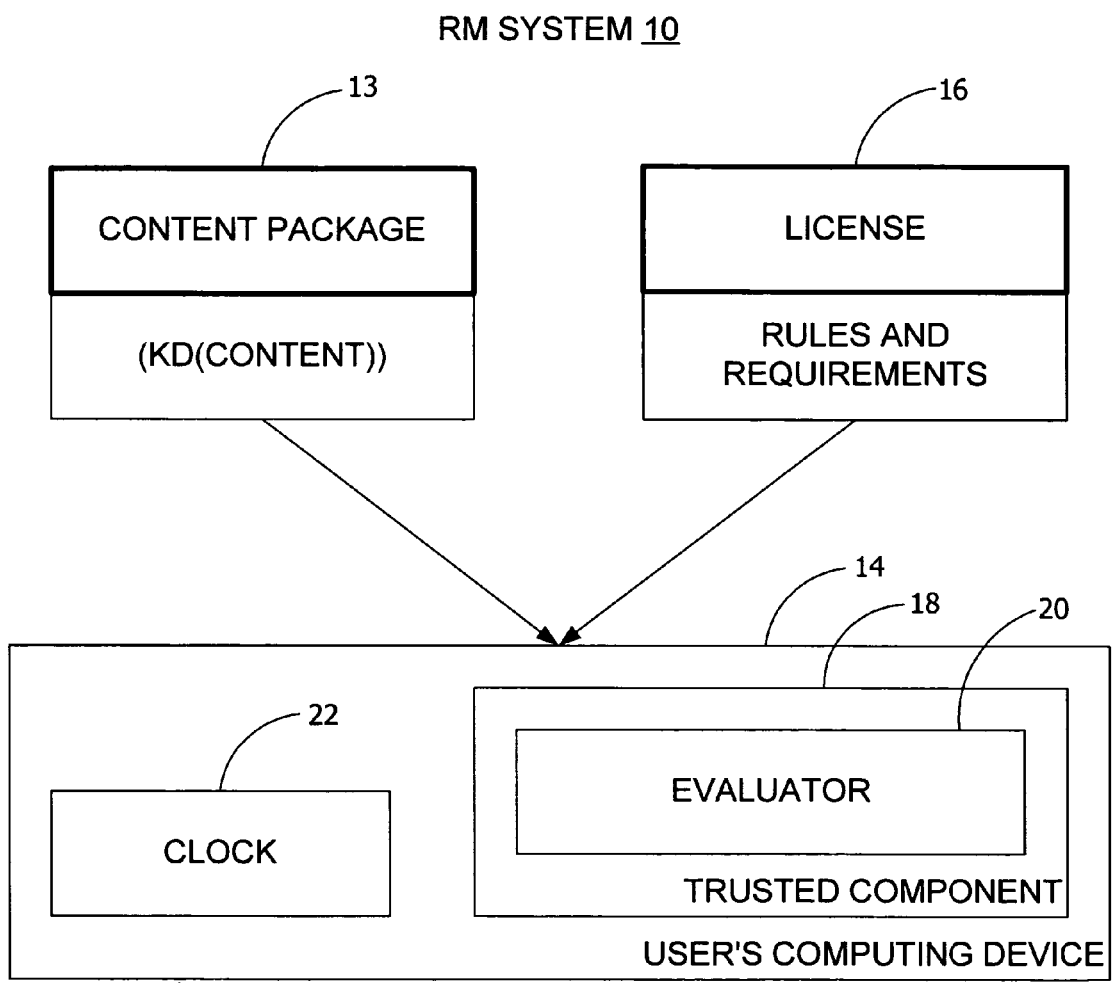
FIG. 1 is a block diagram showing an enforcement architecture of an example of a trust-based system.
Figure 2:
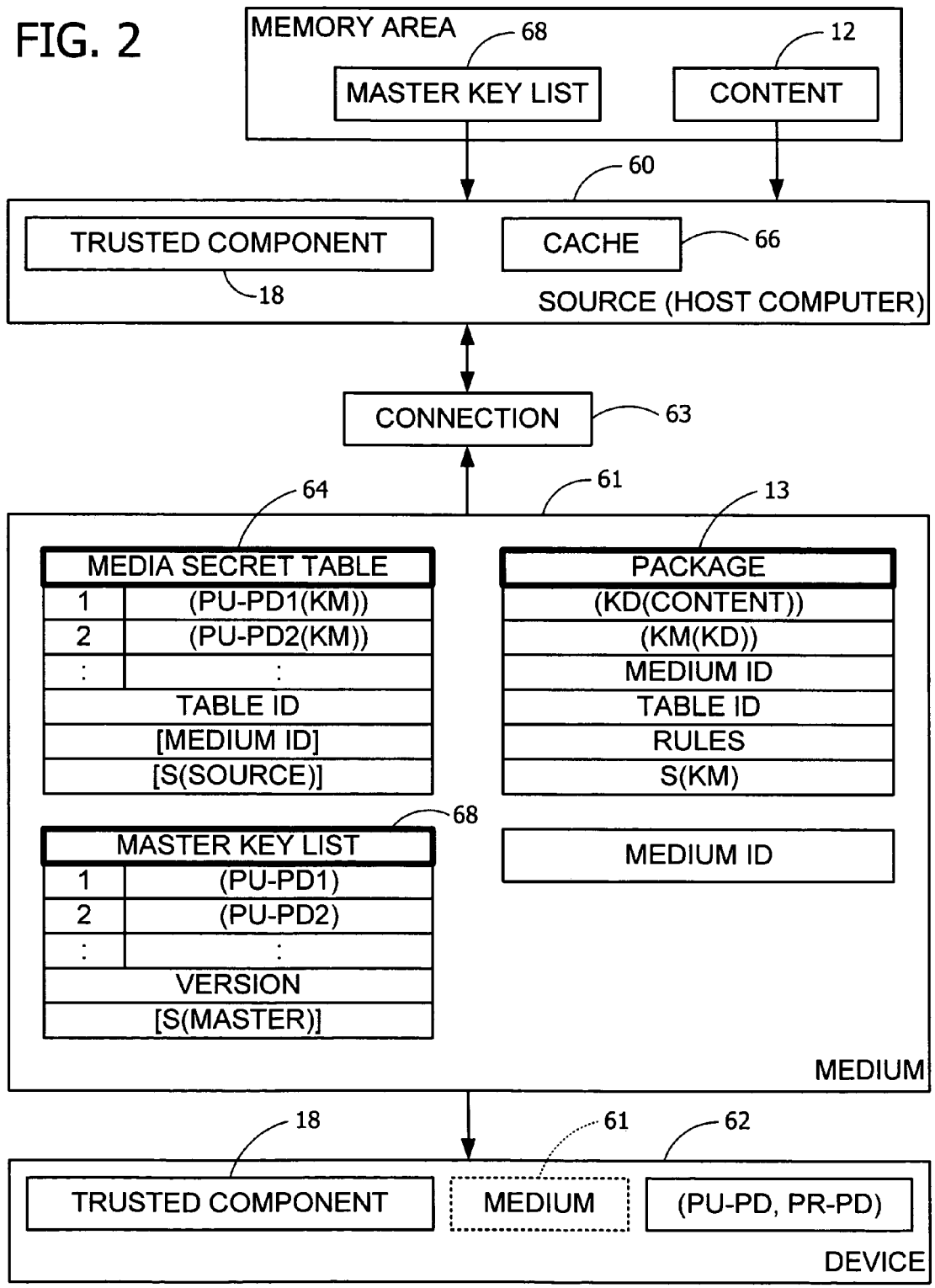
FIG. 2 is a block diagram showing a computing device, a host computer or other source, and a storage medium having a master key list and encrypted content written to by the source and read by the device in accordance with one embodiment of the present invention.

Thus, in the present invention, and referring now to FIG. 2, a playback device 62 renders or plays back the content 12 on a portable medium 61 or other destination computer-readable medium by appropriately receiving such medium 61 or otherwise including the medium 61 therein. Significantly, and as will be set forth in more detail below, the playback device 62 is pre-authorized to access the content 12 on the medium 61 by being granted one or more public-private key pairs (PU-PD, PR-PD) and some form of a trusted component 18, and authorization is confirmed through a media secret table 64 included on the medium 61 with the content 12, where the trusted component 18 of the device 62 uses (PR-PD) to decrypt the encrypted version of the decryption key (KD). The device 62 is thus authorized to render and otherwise use the content 12 by virtue of having (PR-PD) and the trusted component 18, which allows access into the table 64. Public-private key pair technology is known in the art.

In one mode of obtaining and rendering digital content 12, and still referring to FIG. 2, such digital content 12 is downloaded or otherwise obtained from a source 60 and is placed on the portable medium 61 that is either mounted to the playback device 62 or internal to such device 62. Such device 62 may be any appropriate device 14 without departing from the spirit and scope of the present invention. For example, such device 62 may be a portable player with relatively limited functionality, a computing device 14 with relatively extensive functionality, or the like. Moreover, the device 62 may merely be able to render the content 12 or may be able to copy the content 12 to another portable medium 61, if so allowed by the associated rules, as will be set forth in more detail below.

The source 60 may be any appropriate source without departing from the spirit and scope of the present invention, as long as a connection 63 exists between the source 60 and the portable medium 61. For example, the source 60 may be a host computer, a remote server location, or a combination thereof, with the content 12 thereon or available therethrough. It may for example be the case that the content 12 and associated data are downloaded from the source 60 at a kiosk, perhaps at a retail outlet. In another example, source 60 is a DVD recorder while portable medium 61 is a computer-readable media suitable for use in the DVD recorder. Alternatively, it may for example be the case that the device 62 is coupled to a source 60 such as for example a host computer and the content 12 and associated data are downloaded directly thereto.

In one embodiment of the present invention, when the content 12 is downloaded to the medium 61, a corresponding set of usage rules is also obtained and downloaded or otherwise placed on the medium 61. The rules may take any appropriate form without departing from the spirit and scope of the present invention. For example, the rules may be attached to or separate from the content 12 on the medium 61, and may take the form of a more formal license 16 or a less formal set of statements that may be interpreted by and abided by the trusted component 18 on the device 62. Methods and mechanisms for generating such rules are known or should be apparent to those skilled in the art and therefore need not be set forth herein in any detail. Generally, the rules may specify the limitations, if any, to be satisfied to render the corresponding content 12 on the medium 61 at the device 62. In addition, the rules may set forth other provisions such as for example whether the content 12 may be copied to another medium 61.

Note that the content 12 prior to being placed on the medium 61 may or may not already be in an RM-protected form. If so, and assuming that the content 12 at the source 60 is encrypted by a content key (KD) and also that the content key (KD) at the source 60 is encrypted according to an asymmetric key such as the public key of the source 60, (PU), the source 60 obtains the content key (KD) by applying a corresponding private key (PR) and re-encrypting the content key (KD) according to a key of the medium 61 (KM) to form (KM(KD)), where (KM(KD)) is the encrypted version of the content key (KD) and is placed on the medium 61 along with the encrypted content 12. Thus, and as should be appreciated, the content key (KD) as encrypted according to the medium key (KM) to form (KM(KD)) is tied to the medium 61 and not any device 62 in particular.

If not already in an RM-protected form, the content 12 is placed thereinto. In particular, the source 60 selects a content key (KD) for the content 12 and with such content key (KD) encrypts the content 12 to form (KD(content)). Thereafter, the source 60 encrypts the content key (KD) according to the medium key (KM) to form (KM(KD)), where (KM(KD)) is the encrypted version of the content key (KD) and is placed on the medium 61 along with the encrypted content 12. Thus, and again, the content key (KD) as encrypted according to the medium key (KM) to form (KM(KD)) is tied to the medium 61 and not any device 62 in particular.

Referring still to FIG. 2, to download the digital content 12 and associated items to the medium 61, such medium 61 is coupled to the source 60 by way of a connection 63 which may be any appropriate connection without departing from the spirit and scope of the present invention. As may be appreciated, if the medium 61 is some form of portable writable storage, the connection 63 is an appropriate drive to which the medium 61 is mounted. Likewise, if the medium 61 is internal to the device 62, the connection 63 may be an appropriate cable, a wireless link such as an RF or IR link, or the like. Such connections 63 and hardware and/or software in support thereof are known or should be apparent to members of those skilled in the art and therefore need not be described herein in any further detail.

Bearing in mind that the encrypted content 12, the rules therefore, and the content key (KD) encrypted according to the medium key (KM) to form (KM(KD)) are on a storage medium 61, and also bearing in mind that the content key (KD) of the content 12 encrypted according to the medium key (KM) to form KM(KD), and presuming that the medium key (KM) is a symmetric key, such medium key (KM) should also travel with such medium 61. However, and importantly, (KM) should not be exposed, and is therefore stored in an encrypted form on the medium 61. In particular, and in one embodiment of the present invention, (KM) is encrypted by the public key of the device 62 (PU-PD) to form (PU-PD (KM)), and (PU-PD(KM)) is stored in the aforementioned media secret table 64 on the medium 61.

It is to be assumed for purposes of the present invention that the device 62 is unable to communicate its public key (PU-PD) to the medium 61 or the source 60, even though such capability may indeed be present without departing from the spirit and scope of the present invention. Moreover, inasmuch as the medium 61 may be received by any of a multitude of devices 62, the source 60 and/or the user may not know each of the intended receiving devices 62 at the time the content 12 and related items are placed on the medium 61. Accordingly, the source 60 that is encrypting (KM) with (PU-PD) to form (PU-PD(KM)) is already in possession of every possible (PU-PD) key from every possible device 62.

Notably, there could potentially be millions of such devices 62, if not more, and each device 62 could have its own presumably unique (PU-PD) key. However, the aforementioned encrypting entity likely could not be expected to know the unique (PU-PD) key for every such device 62. Accordingly, in one embodiment of the present invention, (PU-PD) keys and corresponding (PR-PD) keys are assigned to participating devices 62 in an organized manner, such as for example by a centralized authority or a standards body. As a result, the number of (PU-PD) keys is kept at a manageable level. In such embodiment, and as may be appreciated, the centralized authority or standards body (hereinafter, 'master') maintains a master key list 68 of the public keys (PU-PD) in an indexed fashion, where the master key list 68 is accessible, either directly or indirectly, by each source 60.

Distributing the key pairs (PU-PD, PR-PD) to devices 62 by or on behalf of the master may be done in any appropriate manner without departing from the spirit and scope of the present invention. For example, each manufacturer of a device 62 could be assigned one or more particular key pairs, whereby all devices 62 manufactured thereby are provided with such manufacturer-specific key pairs. Likewise, each model of a device 62 could be assigned one or more particular key pairs. Similarly, each manufacturer or model of a device 62 could be assigned a number of key pairs that are either randomly or purposefully provided to specific ones of devices 62. Note that if a particular manufacturer or model becomes untrustworthy, each key pair thereof may merely be revoked (as will be discussed below) without affecting other manufacturers or models.

Again, a source 60 downloading protected content 12, rules, and an (KM(KD)) to a medium 61 doesn't necessarily know what device 62 the medium 61 is to be mounted to or is internal to. Accordingly, and as seen in FIG. 2, in one embodiment of the present invention, the source 60 also downloads the media secret table 64 to the medium 61, where such table 64 has therein (KM) encrypted according to each of several public keys of devices (PU-PD) that are known. Importantly, and as should now be appreciated, the table 64 is compiled based on the public keys (PU-PD) in the aforementioned master key list 68. As seen, in the table 64, each encrypted (PU-PDx(KM)) has a corresponding index value x specifying an identifier of the (PU-PD) that encrypted the secret. For example, (PU-PD3) is specified by index value 3. As may be appreciated, such index x corresponds to the indexing in the master key list 68 such that any device 62 knowing an index x of a particular (PU-PDx) thereof may index into the table 64 based on same to obtain (PU-PDx(KM)). In one example, the identifier is 16 bits.

In one embodiment of the present invention, the table 64 includes therein (KM) encrypted according to the (PU-PDx) of the device 62 that is to be employed to render the corresponding content 12. Note that the table 64 may have (KM) encrypted according to every (PU-PDx) that is known to the source 60 based on knowledge of the master key list 68, or to a specific sub-set thereof, all without departing from the spirit and scope of the present invention. For example, a user effectuating such a download may specify that the device 62 is manufactured by a particular manufacturer, and the table 64 thus includes (KM) encrypted according to every (PU-PDx) of the manufacturer. Likewise, the user may specify that the device 62 may be any of a number of particular devices 62, and the table 64 thus includes (KM) encrypted according to every (PU-PDx) of such number of particular devices 62. In another example, the source 60 creates a table such as table 64 that allows access by all non-revoked devices 62.

Remembering that the medium 61 includes a unique medium identifier (ID) that is not easily alterable or copied and that is readable or definable by the device 62, the encrypted content 12 on the medium 61 should be tied thereto based on such medium ID. In one embodiment, the medium ID is a serial number that is written to the medium 61 during manufacturing. Accordingly, as part of copying the content 12 to the medium 61, and in one embodiment of the present invention, the source 60 reads the ID from the medium 61 and attaches the ID to the encrypted content 12 before copying same to the medium 61. As will be explained in more detail below, tying occurs because the device 62 is trusted to render the content 12 from the medium 61 only if such content 12 includes the medium ID of such medium 61.

As shown in FIG. 2, the medium 61 with the content 12 as placed thereon includes the medium ID, the encrypted content (KD(content)), the encrypted content key (KM(KD)), the usage rules for using the content, and the table 64 with a set of (PU-PDx(KM)).

Note that nothing as yet ties the encrypted content key (KM(KD)) to the medium 61 and the medium ID thereof. Accordingly, in one embodiment of the present invention, the encrypted content (KD(content)) is packaged into a content package 13 or file that includes the encrypted content key (KM(KD)), the usage rules for using the content, and a copy of the medium ID. Thus, (KM(KD)) and the medium ID are now tied together by being in the same package 13. Of course, a nefarious entity may attempt to alter the package 13, and so to thwart such an attempt, at least the medium ID within the package 13 is employed as the basis for a digital signature which is appended to the package 13. Thus, any attempt to alter the medium ID would cause the signature to fail to verify. In such embodiment, the medium key (KM) may be employed as the signature verification key in the manner set forth below.

Note, too, that as yet nothing ties the package 13 to the table 64. Put another way, it may be the case that content 12 is placed on the medium 61 in multiple sessions, where the medium key (KM) employed is different for each session. In such case, the medium 61 may include multiple packages 13 and tables 64 thereon, where each media secret table is based on a different session and therefore a different medium key (KM). Each session is independent. Accordingly, in one embodiment of the present invention, a table ID identifies each table 64 and each package 13 includes a table ID of a table 64 that is to be employed in connection with such package 13. Thus, the table ID in the package 13 is employed to locate the corresponding table 64 to be employed therewith.

Note that it may be the case that the device 62 is itself capable of acting as a derivative source such as source 60 and therefore itself placed content 12 on another medium 61. To do so, however, the device 62 acting as the derivative source needs a current copy of the master key list 68. If, however, the device 62 cannot itself obtain the current copy of the master key list 68 directly from the master or an agent thereof, and in one embodiment of the present invention, such device 62 may obtain such current copy of the master key list 68 by way of such copy being stored on the medium 61 by the source 60 that itself obtains the current copy directly from the master or an agent thereof.

Accordingly, and in one embodiment of the present invention, the source 60 does indeed place the current copy of the master key list 68 on the medium 61 to be available to any device 62 acting as a derivative source. In such embodiment, the master upon updating the master key list 68 applies a non-decreasing version number thereto, and may sign the master key list 68 with an appropriate key. Thus, a device 62 which acts as a secondary source such as source 60 upon encountering a medium 61 determines based on the version number of the master key list 68 thereon whether the medium 61 has a more current master key list 68 than the master key list 68 of such device 62, and if so, the device 62 copies the master key list 68 from the medium to the device 62. Of course, in doing so, the device 62 ensures that the signature of the master key list 68 verifies to ensure that such list 68 has not been altered.

As shown in FIG. 2, the medium 61 with the content 12 as placed thereon includes:
 the medium ID;
 the package 13 with:
  the encrypted content (KD(content));
  the encrypted content key (KM(KD));
  the medium ID (to link the medium to the package);
  the table ID (to link the package to the master key list);
  the usage rules for using the content; and
  a signature based on at least the medium ID and i. verifiable with (KM);
 the media secret table 64 with a set of (PU-PDx(KM))s and the table ID;
 the master key list 68 with a set of (PU-PD)s, a version number, and a signature.

To render the content 12 on the medium 61, the device 62 refers to the table 64 on the medium 61 that corresponds to the content 12 and indexes to (KM) encrypted according to the (PU-PDx) of such device 62. In particular, and referring now to FIG. 3, the device 62 upon being directed to render the content 12 at 301 refers to the rules for such content 12 as set forth within the package 13 having such content 12, and determines by way of the evaluator 20 of the trusted component 18 whether the rules are satisfied at 302.

Assuming that such rules are in fact satisfied, the device 62 obtains the table 64 corresponding to the content 12/package 13 based on the table ID in the package 13 and in the table 64 at 303, obtains the private key of such device 62 (PR-PDx) and the index value x of such device 62 at 305, indexes into the table 64 based on the obtained index value x at 307, and selects the corresponding (PU-PDx(KM)) at 309. The device 62 applies the obtained (PR-PDx) to the encrypted (PU-PDx (KM)) to expose the medium key (KM) of the table 64 at 311.

With (KM), the device 62 verifies the signature appended to the package 13 to authenticate at least the medium ID within the package at 313, and also ensures that the medium ID within the package 13 matches the medium ID on the medium 61 itself at 315. As may be appreciated, in doing so, the device confirms that the package 13 is indeed properly tied to the medium 61 on which it resides, and that a nefarious entity has not improperly copied the package 13 and related items from another medium 61.

Once proper tying is confirmed, the device 62 may obtain (KM(KD)) from the package 13 of the content 12 at 317, and applies (KM) to (KM(KD)) to expose (KD) at 319. The device 62 obtains (KD(content)) from the package 13 and applies (KD) to (KD)content)) to expose and render the content at 321. Finally, if the device 62 acts as a derivative source, the device 62 checks copy of the master key list 68 on the medium 61 for the version number thereof, and if earlier than the version number of the copy of the master key list 68 on the device 62, such device 62 adopts the copy of the master key list 68 from the medium 61 by copying same at 323.

As set forth above, the table 64 produced by the source 60 may have (KM) encrypted according to every (PU-PDx) that is known to the source 60, or to a specific sub-set thereof. As may be appreciated, to revoke a particular (PU-PDx), such (PU-PDx) may be excluded from the table 64, and a corresponding device 62 therefore cannot obtain (PU-PDx(KM)) the table 64 to render the corresponding content 12. Alternatively, a corresponding device 62 is barred from rendering the content 12 by leaving blank the field in the table 64 for the corresponding (PU-PDx(RND)), wherein RND represents a random integer, or by filling the field with any alternate data such as zeroes, gibberish or nonsense data. As may be appreciated, the master decides when a (PU-PDx) is no longer trustworthy and therefore is to be invalidated, or receives such decision from another entity.

If it is the case that the device 62 is provided with more than a single key pair (PU-PDx, PR-PDx), the device 62 attempts to employ each available (PR-PDx) on the table 64 until one is found to expose (KM). In such embodiment, to invalidate the device 62 (e.g., as being non-trustworthy), the source 60 leaves out from the table 64 the entries that would correspond to all of the (PU-PDx)s of the device 62. In such a situation, an invalidated device 62 with (PU-PDx)s A, B, C, and D would result in the 'cancellation' of such device keys A, B, C, and D from the table 64. Note that in such situation, a device 62 with (PU-PDx)s B, C, D, and E would still be able to access from the table 64 the secret as indexed under device key E, assuming device key E was not canceled too, but not the (PU-PDx)s as indexed under device keys B, C, or D.

In the manner that the package 13 with the content 12 is tied to the medium 61 by having the medium ID therein, the table 64 may in addition or in the alternative be tied to the medium 61 by having the medium ID therein. Thus, the table 64 cannot be freely transported to other media 61. In such case, the table 64 may include a signature based at least in part on the medium ID to prevent tampering, and such signature may be verified in conjunction with operations 313 and 315 of FIG. 3.

Note that the table 64 is placed on the medium 61 with the content 12 during a session and pertains only to the content 12 of such session and not to content 12 of any future session. Such table 64 is not ever updated or modified, even if one or more (PU-PDx)s within the table 64 have subsequently been added or revoked in the master key list 68 by the master. Put another way, revocation of a (PU-PDx) is only with regard to tables 64 created after the revocation, and content 12 tied thereto. In such a situation, it is to be recognized that as a policy matter older content 12 will be accessible even by a revoked device 62, but newer content 12 will not likewise be accessible by such a revoked device 62.

Figure 4:
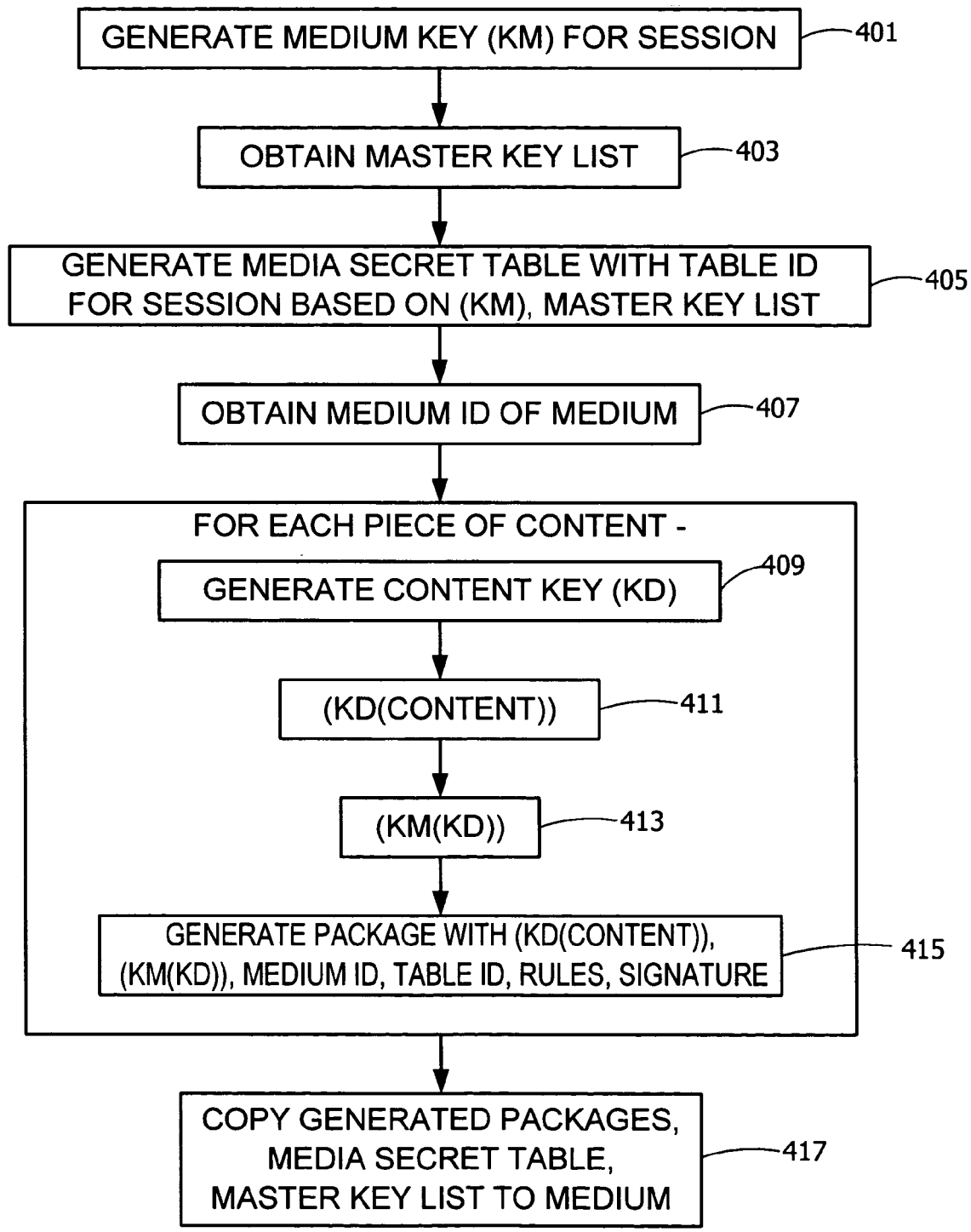
FIG. 4 is a flow diagram showing key operations performed by the source of FIG. 2 in copying the content to the medium of FIG. 2.

Referring now to FIG. 4, to write one or more pieces of content 12 to a medium 61 during a particular session, the source 60 generates a medium key (KM) for the session at 401, obtains the master key list 68 from the master or else ensures that the master key list 68 is current at 403, and generates a media secret table 64 for the session based on (KM) and the master key list 68 at 405. Production of the table 64 may be done by any appropriate method without departing from the spirit and scope of the present invention.

For example, for each valid (PU-PDx) in the master key list 68, such (PU-PDx) is employed to encrypt (KM), and such (PU-PDx(KM)) is appropriately placed in the table 64 being produced. Note, though, that for each invalid (PU-PDx) in the master key list 68, (KM) is not encrypted thereby and placed in the table 64 being produced. Instead, the space for such (PU-PDx(KM)) is merely left blank, filled with some predetermined value such as zeroes, or completely omitted. In addition, a table ID is placed in the table 64 in an appropriate location, and any other items are produced and placed in the table 64 as well. Such other items may include a signature and the medium ID of the medium 61 to which the table 64 is to be copied, among other things.

As should now be appreciated, one or more tables 64 may be generated or partially generated in advance and placed in a cache 66 available to the source, especially if production of each table 64 is especially computationally exhaustive. If so, the tables 64 may be generated and placed into the cache 66 by a media secret table server or the like (not shown) for removal and use by the source 60, where the media secret table server performs operations 401-405. It may alternately be the case that a new table 64 is obtained on demand directly from the media secret table server operating as the cache 66. Note that the source 60 may use a table 64 from the cache 66 once or more than once without departing from the spirit and scope of the present invention.

At this point, the source has for the session (KM) and the table 64 that hides (KM), where the table has a table ID. In addition, the source 60 obtains the medium ID of the medium 61 therefrom at 407, and for each piece of content 12, the source 60: generates a content key (KD) at 409; encrypts the content 12 with the content key (KD) to result in (KD(content)) at 411; encrypts (KD) with the medium key (KM) to result in (KM(KD)) at 413; and generates a package 13 for the content 12 with (KD(content)), (KM(KD)), the medium ID, the table ID, usage rules for using the content, and a signature based on at least the medium ID and verifiable with (KM) at 415.

Once the source 60 has generated all the packages 13 for the session, the source 60 copies each generated package 13, the media secret table 64, and the master key list 68 to the medium 61 at 417 to finalize the session. Thereafter, the source 60 may take any appropriate post-copying action. For example, if the content 12 is supplied as part of a financial transaction, the source 60 may mark the transaction complete, charge an account, increment or decrement a count value, etc.

Note that the medium 61 may or may not allow additional copying sessions to take place at later times. If so, and as was set forth above, each new session is signified by a different table 64, where the content packages 13 of such session are tied to the table 64 of such session. Note, too, that in an alternate embodiment of the present invention and to simplify matters, the session medium key (KM) may be employed to encrypt content directly.

Note, further, that the operations performed in connection with FIG. 4 take place without regard to any particular device 62. In particular, the operations do not take into consideration whether the device 62 to which the medium 61 is to be mounted or is internal to is valid and thus has valid (PU-PDx) key(s). In fact, the source 60 likely has no way of verifying such validity prior to copying the packages 13 to the medium 61. If in fact an invalidated device 62 attempts to render the content 12 on the medium 61, where the content 12 is encrypted according to a copy of the master key list 68 later than the revocation of the invalidated device 62, the attempt will fail, but if the content 12 is encrypted according to a copy of the master key list 68 earlier than the revocation of the invalidated device 62, the attempt will succeed.

Once content 12 has been copied to the medium 61, such content 12 may be rendered by any device 62 that has compatible software and is capable of reading the medium 61 and capable of accepting same, if the medium 61 is separate therefrom. The device 62 should have an appropriate trusted component 18 and a private key (PR-PDx) that indexes into the table 64 on the medium 61. In addition, the device 62 is not a device that has been revoked or invalidated from the table 64 and not able to access from the table 64 the secret needed to render the content 12.

Figure 5:
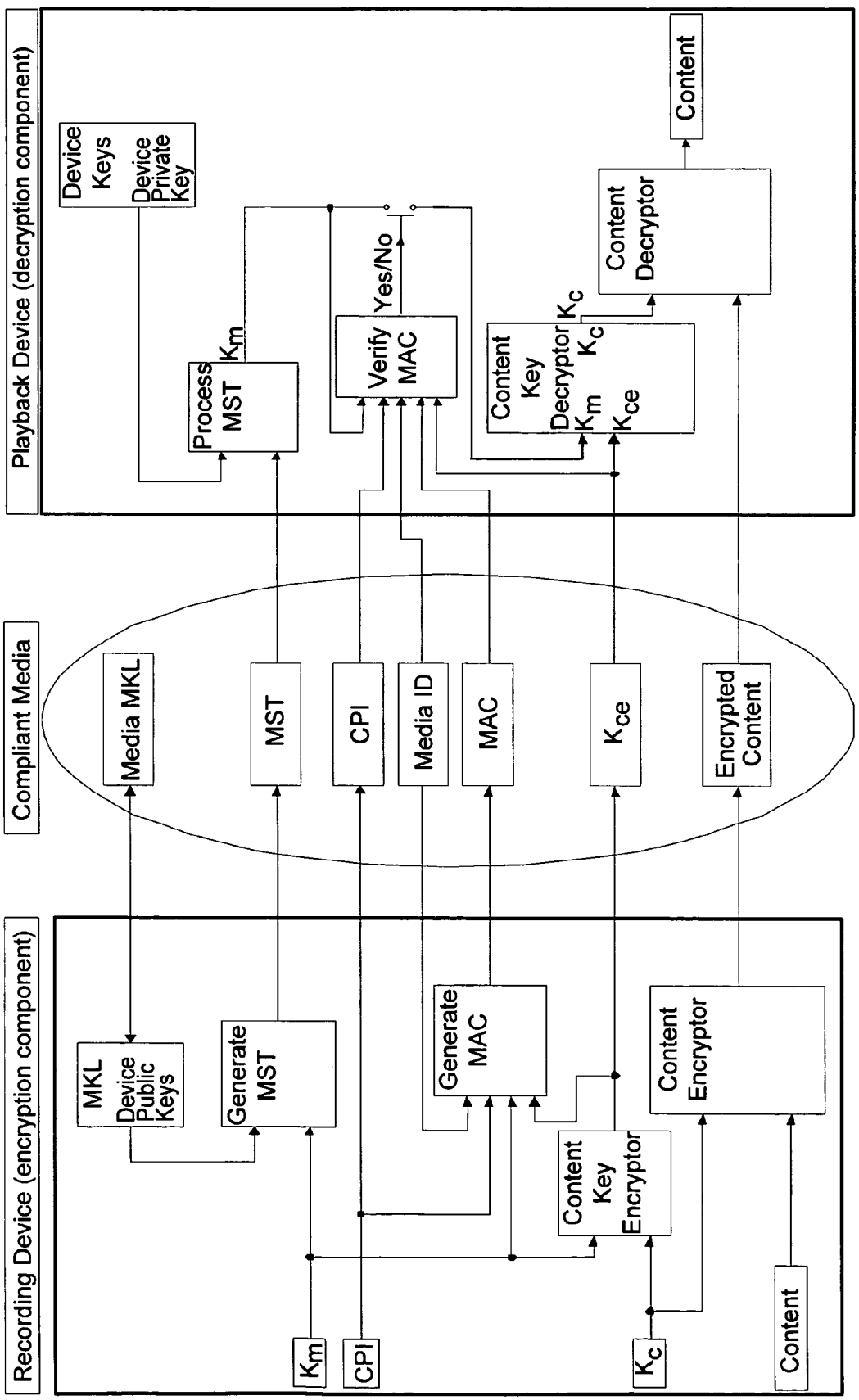
FIG. 5 is a block diagram showing an exemplary architecture of one implementation of the invention.

Referring next to FIG. 5, a block diagram illustrates an exemplary architecture of an embodiment of the invention. In particular, a recording device encrypts content for storage on a compliant media for ultimate rendering by a playback device. Further, while the invention is operable with any encryption and decryption technology, the example of FIG. 5 illustrates Advanced Encryption Standard (AES) block cipher encryption and decryption in Cipher Block Chaining (CBC) mode. Alternatively or in addition, the invention is also operable with encryption technology such as Elliptic Curve Cryptography (ECC) (e.g., an elliptic curve ElGamal cipher algorithm or an elliptic curve digital signature algorithm). Further, in the example of FIG. 5, the media key is 128 bits, the media secret table has a maximum memory of two megabytes, the medium identifier is 64 bits, the MAC is 128 bits, and the content key is 128 bits.

Figure 6:
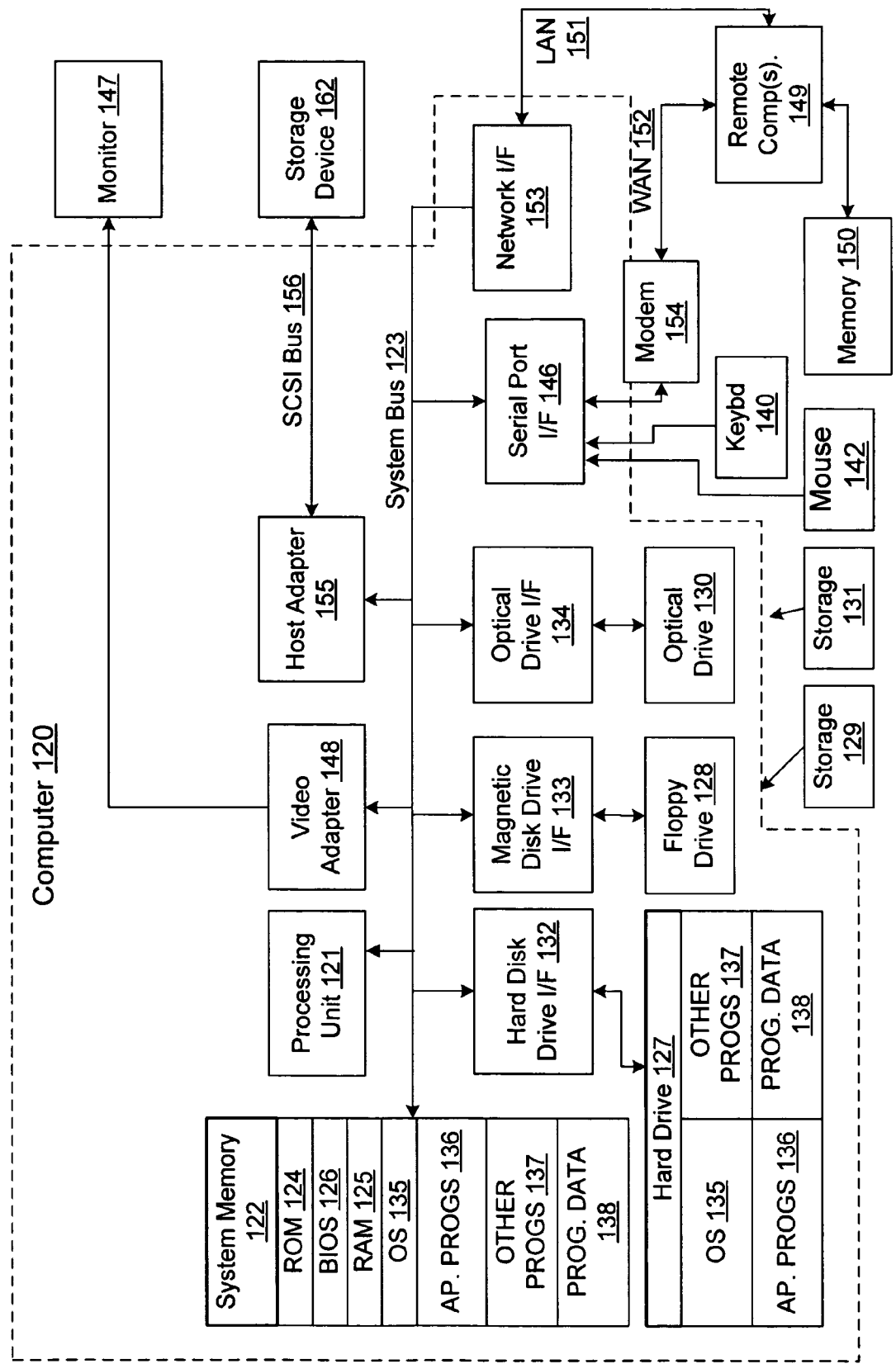
FIG. 6 is a block diagram representing a general purpose computer system in which aspects of the present invention and/or portions thereof may be incorporated.

FIG. 6 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. For purposes of illustration, programs and other executable program components, such as the operating system, are illustrated herein as discrete blocks. It is recognized, however, that such programs and components reside at various times in different storage components of the computer, and are executed by the data processor(s) of the computer. The invention also includes the computer itself when programmed according to the methods and techniques described herein. Moreover, it should be appreciated that the invention and/or portions thereof may be practiced with other computer system configurations, including hand-held devices, multi-processor systems, microprocessor-based or programmable consumer electronics such as digital versatile disc (DVD) players and recorders, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The computer 120 typically has at least some form of computer readable media. Computer readable media, which include both volatile and nonvolatile media, removable and non-removable media, may be any available medium that may be accessed by computer 120. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 120. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which stores data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Although described in connection with an exemplary computing system environment, including computer 120, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The present invention may be practiced with regard to any appropriate source 60, medium 61, and device 62. More concretely, the present invention for example could be used to enable a CD player to play a CD with protected music, to allow a set-top box to have access to a premium television broadcast, etc. Accordingly, the device 62 is to be interpreted to encompass any device that has a set of device keys (PU-PD, PR-PD) and is capable of receiving content 12 and an accompanying table 64 and obtaining the keys to render the received content 12 from the table 64 based on (PR-PD), or the like.

Programming that effectuates the processes performed in connection with the present invention is relatively straight-forward and should be apparent to the relevant programming public. Accordingly, such programming is not attached hereto. Any particular programming may be employed to effectuate the present invention without departing from the spirit and scope thereof.

In the foregoing description, it can be seen that the present invention comprises a new and useful method and mechanism that allows the RM system 10 to tie the encrypted decryption key (KD) to an object such as a medium 61 such that the encrypted decryption key (KD) cannot be obtained except in the presence of such object/medium 61. The object/medium 61 may thus be portable, such as an optical or magnetic storage disk, so that a user transports the object/medium 61 with the encrypted decryption key thereon among multiple computing devices 14 or playback devices 62.

Figure 3:
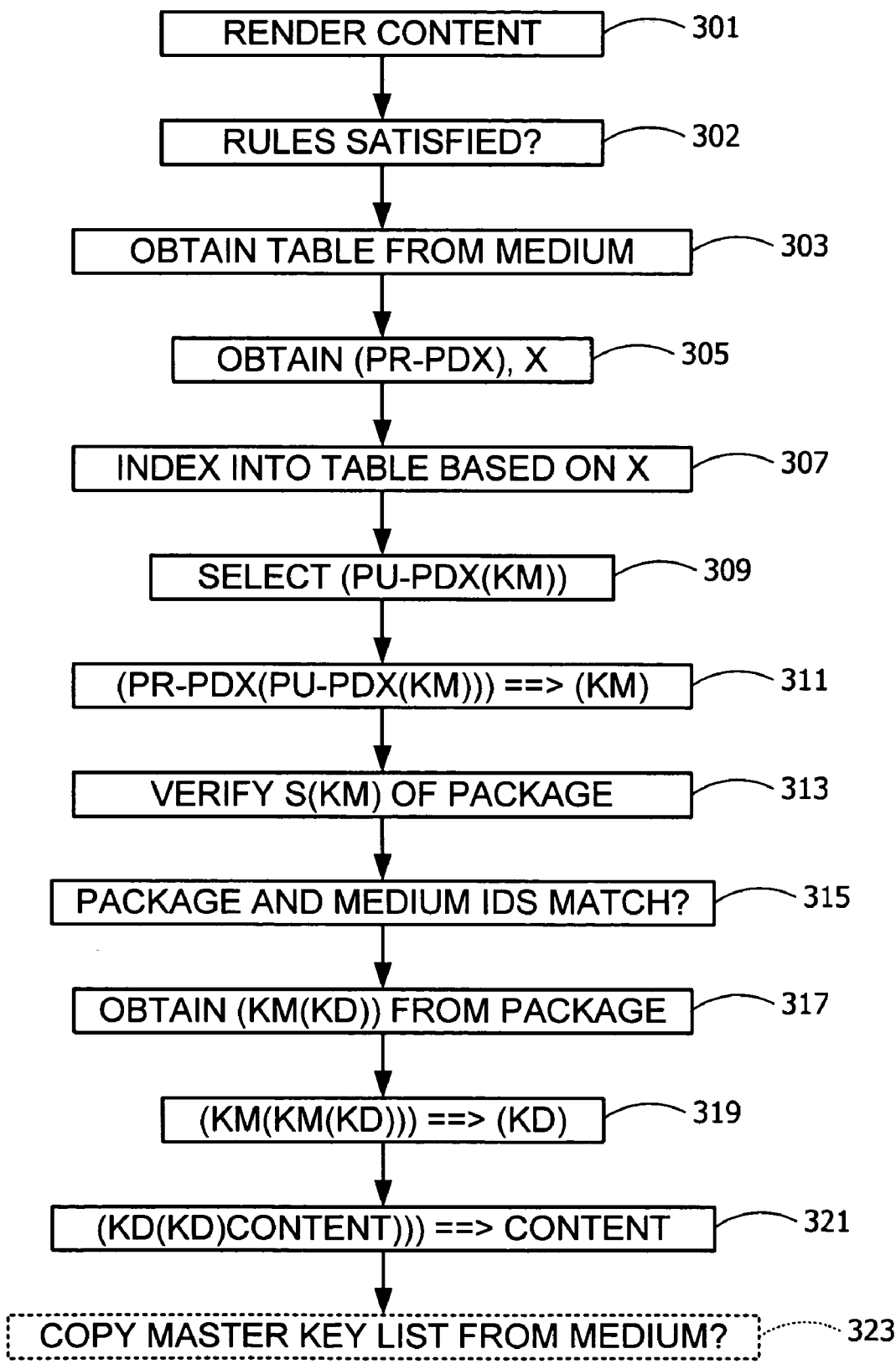
FIG. 3 is a flow diagram showing key operations performed by the device of FIG. 2 in rendering the content from the medium of FIG. 2.

In operation, computer 120 executes computer-executable instructions such as those illustrated in FIG. 3 and FIG. 4 to implement embodiments of the invention.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention. Further, the methods in whole or in part may be implemented in hardware (e.g., a large-scale integration implementation), software, or any combination therein (e.g., firmware) and be within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained. As various changes could be made in the above constructions, products, and methods without departing from the scope of the invention, it is intended that all matter contained in the above description and shown in the accompanying drawings shall be interpreted as illustrative and not in a limiting sense. It should be understood, therefore, that this invention is not limited to the particular embodiments disclosed, but it is intended to cover modifications within the spirit and scope of the present invention as defined by the appended claims.

The invention claimed is:

1. A method for encrypting content with copy protection for storage on a destination computer-readable medium during a download session, said method comprising:
    encrypting the content with a content key;
    generating a medium key specific for the download session to be associated with a destination computer-readable medium;
    encrypting the content key with the medium key;
    encrypting the generated medium key with one or more public keys, each of the public keys corresponding to an end user device;
    defining a medium identifier associated with the destination computer-readable medium, said medium identifier being obtained from the destination computer-readable medium and uniquely identifying the destination computer-readable medium associated therewith;
    associating the defined medium identifier with the encrypted content;
    creating a media secret table for the encrypted content for the download session, said media secret table including the encrypted medium key specific to the download session;
    generating a media secret table identifier uniquely identifying the created media secret table and associating the generated media secret table identifier with the encrypted content; and
    storing, on the destination computer-readable medium, the encrypted content, the encrypted content key, the encrypted medium key, the created media secret table, and the defined medium identifier associated with the encrypted content, wherein comparing the defined medium identifier associated with the encrypted content to a reference medium identifier prior to rendering the content provides copy protection for the content.

2. The method of claim 1, further comprising receiving the plurality of public keys via a network from a licensing organization.

3. The method of claim 1, further comprising receiving the content from a content provider.

4. The method of claim 1, wherein generating the medium key comprises generating a random number.

5. The method of claim 1, further comprising storing the media secret table in a cache.

6. The method of claim 1, further comprising generating the content key.

7. The method of claim 1, further comprising:
    generating a message authentication code (MAC) as a function of the generated medium key; and
    storing the generated MAC on the destination computer-readable medium.

8. The method of claim 1, further comprising:
    generating a digital signature as a function of the medium key; and
    storing the generated digital signature on the destination computer-readable medium.

9. The method of claim 1, further comprising receiving a request to render the content on the medium.

10. The method of claim 1, wherein one or more computer-readable media have computer-executable instructions for performing the method recited in claim 1.

11. A method for decrypting copy protected content stored on a computer-readable medium for rendering by an end user device, said computer-readable medium storing a package including encrypted content from a specific storing session, an encrypted content key, one or more medium keys each being encrypted by a public key associated with one of a plurality of end user devices, a media secret table storing medium keys specific for the storing session, and a medium identifier, said end user device having a private key associated therewith, said method comprising:
    calculating a medium key for the end user device from the encrypted medium keys as a function of the private key and a media secret table identifier of the media secret table, said media secret table storing the encrypted medium keys from which the medium key for the end user device is calculated;
    determining a reference medium identifier for the computer-readable medium, said reference medium identifier being obtained from the computer-readable medium and uniquely identifying the computer-readable medium;
    comparing the reference medium identifier with the medium identifier stored in the package; and
    if the reference medium identifier matches the medium identifier stored in the package as a function of said comparing, decrypting the encrypted content key with the calculated medium key and decrypting the encrypted content with the decrypted content key.

12. The method of claim 11, further comprising reading the media secret table from the computer-readable medium on which the copy protected content is stored.

13. The method of claim 12, wherein reading the media secret table comprises reading the media secret table identifier and identifying the media secret table on the computer-readable medium based on the read media secret table identifier.

14. The method of claim 11, wherein the computer-readable medium further stores a message authentication code (MAC), and wherein comparing the defined medium identifier with the medium identifier stored in the package comprises verifying the MAC.

15. The method of claim 14, wherein verifying the MAC comprises:
calculating a reference MAC as a function of the defined medium identifier and the encrypted content key; and
comparing the calculated reference MAC to the MAC stored on the computer-readable medium.

16. The method of claim 11, further comprising rendering the decrypted content.

17. The method of claim 16, wherein the computer-readable medium further stores a set of rules, and wherein rendering the decrypted content comprises rendering the decrypted content in accordance with the set of rules.

18. The method of claim 11, wherein the computer-readable medium further stores a digital signature, and further comprising verifying the digital signature as a function of the calculated medium key.

19. The method of claim 11, wherein one or more computer-readable media have computer-executable instructions for performing the method recited in claim 14.

20. A system for recording content with copy protection onto a computer-readable medium during a recording session, said system comprising:
a memory area for storing content, a medium identifier associated with the computer-readable medium and one or more public keys each corresponding to an end user device, a media secret table corresponding to the recording session, and one or more usage rules associated with the stored content, said medium identifier uniquely identifying the computer-readable medium and being obtained therefrom; and
a processor configured to execute computer-executable instructions for:
encrypting the content stored in the memory area with a content key;
generating a medium key to be associated with the computer-readable medium;
encrypting the content key with the medium key;
encrypting the generated medium key with each of the public keys stored in the memory area;
creating the media secret table for the encrypted content for the recording session, said media secret table including the encrypted medium keys specific to the recording session;
generating a media secret table identifier uniquely identifying the created media secret table and associating the generated media secret table identifier with the encrypted content; and
storing, on the computer-readable medium, the encrypted content, the encrypted content key, the encrypted medium key, the created media secret table and the medium identifier associated with the computer-readable medium, wherein comparing the medium identifier associated with the computer-readable medium to a reference medium identifier prior to rendering the content provides copy protection for the content.

21. The system of claim 20, wherein the memory area and the processor are associated with a digital versatile disc recorder.

22. The system of claim 20, wherein the processor is further configured for creating a media secret table for the content, said media secret table including the encrypted medium keys.

23. The system of claim 20, wherein the one or more usage rules comprise a license.

24. A system for rendering copy protected content stored on a computer-readable medium by an end user device, said system comprising:
a memory area for storing a reference medium identifier associated with the computer-readable medium, encrypted content, a medium identifier associated with the encrypted content, an encrypted content key, one or more medium keys each encrypted by a public key associated with one of a plurality of end user devices, one or more media secret tables, each of said media secret tables corresponding to a portion of the encrypted content that was downloaded during a single session and associated with at least one medium key distinct from all other medium keys, and a private key associated with the end user device, said reference medium identifier being obtained from the computer-readable medium and uniquely identifying the computer-readable medium; and
a processor configured to execute computer-executable instructions for:
calculating a medium key for the end user device from the encrypted medium keys stored in the corresponding media secret table, said media secret table being determined as a function of the private key and a media secret table identifier of the media secret table associated with the encrypted medium key corresponding to the calculated medium key;
comparing the reference medium identifier with the medium identifier associated with the encrypted content; and
if the reference medium identifier matches the medium identifier associated with the encrypted content as a function of said comparing, decrypting the encrypted content key with the calculated medium key and decrypting the encrypted content with the decrypted content key.

25. The system of claim 24, wherein the memory area further stores a master key list including the public keys associated with the plurality of end user devices.

26. The system of claim 24, wherein the memory area further stores a digital signature; said digital signature being a function of the calculated medium key.

27. The system of claim 24, wherein the media secret table identifier specifies a location for the media secret table in the memory area.

28. The system of claim 24, wherein the memory area stores the encrypted content, the encrypted content key, and the medium identifier associated with the encrypted content as one of a plurality of data structures, each of the plurality of data structures storing content encrypted according to a content key associated with the data structure.

29. The system of claim 24, wherein the memory area and the processor are associated with a digital versatile disc player.

30. One or more computer-readable storage media having computer-executable components for providing copy protection for content, said components being executable on an end user device, said components comprising:
an encryption component for encrypting the content by:
generating a medium key to be associated with a computer-readable medium;
encrypting the generated medium key with one or more public keys, each of the public keys corresponding to an end user device;

creating a media secret table for each portion of the content downloaded during to the computer-readable medium during different download sessions, each of said media secret tables including the encrypted generated medium keys for a corresponding one of the download sessions;

encrypting the content with a content key;

encrypting the content key with at least one of the medium keys;

defining a medium identifier associated with the computer-readable medium, wherein defining the medium identifier comprises obtaining the medium identifier from the computer-readable medium and wherein said medium identifier uniquely identifies the computer-readable medium;

associating the defined medium identifier with the encrypted content; and storing, on the computer-readable medium, the encrypted content, encrypted content key, media secret tables, and defined medium identifier as a group on the computer-readable medium; and a decryption component for decrypting the content encrypted by the encryption component and enforcing copy protection by:

calculating the medium key for the end user device from the media secret table as a function of the private key and a media secret table identifier of the media secret table associated with the encrypted medium key from which the medium key for the end user device is calculated;

determining a reference medium identifier for the computer-readable medium, said reference medium identifier being obtained from the computer-readable medium itself and uniquely identifying the computer-readable medium;

comparing the determined reference medium identifier with the medium identifier stored in the group of the encrypted content, encrypted content key, media secret table, and associated medium identifier on the computer-readable medium;

if the determined reference medium identifier corresponds to the medium identifier stored in the group as a function of said comparing, decrypting the encrypted content key with the calculated medium key and decrypting the encrypted content with the decrypted content key; and rendering the decrypted content.

\* \* \* \* \*

UNITED STATES PATENT AND TRADEMARK OFFICE
CERTIFICATE OF CORRECTION

PATENT NO. : 7,644,446 B2
APPLICATION NO. : 10/945542
DATED : January 5, 2010
INVENTOR(S) : Strom et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this

Sixteenth Day of November, 2010

David J. Kappos
*Director of the United States Patent and Trademark Office*